(12) United States Patent
Chen

(10) Patent No.: US 7,841,245 B1
(45) Date of Patent: Nov. 30, 2010

(54) ELECTRONIC TORQUE WRENCH

(76) Inventor: Hsin-Nien Chen, No. 14, Industrial 3$^{rd}$ Road, Situn, Taichung 40767 (TW)

( * ) Notice: Subject to any disclaimer, the term of this patent is extended or adjusted under 35 U.S.C. 154(b) by 0 days.

(21) Appl. No.: 12/455,876

(22) Filed: Jun. 9, 2009

(51) Int. Cl.
*G01D 1/00* (2006.01)

(52) U.S. Cl. .................................................. 73/862.23
(58) Field of Classification Search .. 73/862.21–862.23
See application file for complete search history.

(56) References Cited

U.S. PATENT DOCUMENTS

| | | | |
|---|---|---|---|
| 3,970,155 A | 7/1976 | Otto | 73/139 |
| 4,265,109 A * | 5/1981 | Hallbauer et al. | 73/862.23 |
| 4,669,319 A * | 6/1987 | Heyraud | 73/862.23 |
| 4,982,612 A | 1/1991 | Rittmann | 73/862.23 |
| 6,119,562 A * | 9/2000 | Jenkins | 81/479 |
| 6,968,759 B2 * | 11/2005 | Becker et al. | 81/479 |

* cited by examiner

*Primary Examiner*—Lisa M Caputo
*Assistant Examiner*—Octavia Davis
(74) *Attorney, Agent, or Firm*—Charles E. Baxley

(57) ABSTRACT

An electronic torque wrench includes a wrench member mounted to a wrench handle for receiving one or more strain gages, and a digital display pivotally attached to the wrench handle for allowing the digital display to be pivoted relative to the wrench handle to different angular position and for allowing the digital display to be easily seen by the user and for allowing the bending strain or the torque or the information detected or measured by the strain gages to be easily seen from the displayer. The displayer is pivotable relative to the wrench handle to various or different angular position to allow the displayer to be easily seen by the user.

4 Claims, 7 Drawing Sheets

ELECTRONIC TORQUE WRENCH

BACKGROUND OF THE INVENTION

1. Field of the Invention

The present invention relates to an electronic torque wrench, and more particularly to an electronic torque wrench including a digital display pivotally attached to a wrench handle for allowing the digital display to be pivoted or rotated relative to the wrench handle to various angular position and for allowing the digital display to be easily seen by the user.

2. Description of the Prior Art

Typical electronic torque wrenches comprise one or more strain gages mounted in the beam section of a torque wrench and disposed between a wrench head and a wrench handle, and a digital readout coupled to the strain gages for displaying the information detected by the strain gages.

For example, U.S. Pat. No. 3,970,155 to Otto discloses one of the typical electronic torque wrenches comprising a strain measuring bridge circuit disposed to measure the bending strain of the wrench handle, and coupled between one or more strain gages and a digital readout to detect the bending strain or the torque of the torque wrenches.

However, the digital readout is embedded in the wrench handle and may be covered or shielded by the hand of the user that holds the wrench handle such that the digital readout may not be easily seen by the user.

U.S. Pat. No. 4,982,612 to Rittmann discloses another typical electronic torque wrench comprising a control circuit disposed on a circuit board to measure the bending strain or the torque of the wrench handle, and coupled between one or more strain gages and a digital display to detect the bending strain or the torque of the torque wrenches.

However, the digital display is embedded in the wrench handle and may be covered or shielded by the hand of the user that holds the wrench handle such that the digital display may not be easily seen by the user.

The present invention has arisen to mitigate and/or obviate the afore-described disadvantages of the conventional electronic torque wrenches.

SUMMARY OF THE INVENTION

The primary objective of the present invention is to provide an electronic torque wrench including a digital display pivotally attached to a wrench handle for allowing the digital display to be pivoted or rotated relative to the wrench handle to various angular position and for allowing the digital display to be easily seen by the user.

In accordance with one aspect of the invention, there is provided an electronic torque wrench comprising a wrench member, a wrench handle mounted to the wrench member and to be held by a user for operating the wrench member, at least one strain gage disposed in the wrench member, and a digital display pivotally attached to the wrench handle for allowing the digital display to be pivoted relative to the wrench handle to different angular position and for allowing the digital display to be easily seen by the user and for allowing the bending strain or the torque or the information detected or measured by the strain gages to be easily seen from the displayer.

The wrench handle includes a recess formed therein for receiving and storing the digital display. For example, the wrench handle includes a socket formed therein and communicative with the recess of the wrench handle for pivotally attaching the digital display.

The digital display includes a seat pivotally attached to the wrench handle for allowing the seat to be pivoted relative to the wrench handle to different angular position, and a displayer attached to the seat.

The seat includes a pivot axle, the displayer is pivotally attached to the pivot axle of the seat and rotatable relative to the seat to different angular position. The displayer may include two opposite screens for displaying the bending strain or the torque or the information detected or measured by the strain gages and for allowing either of the screens to be easily and readily seen by the user.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
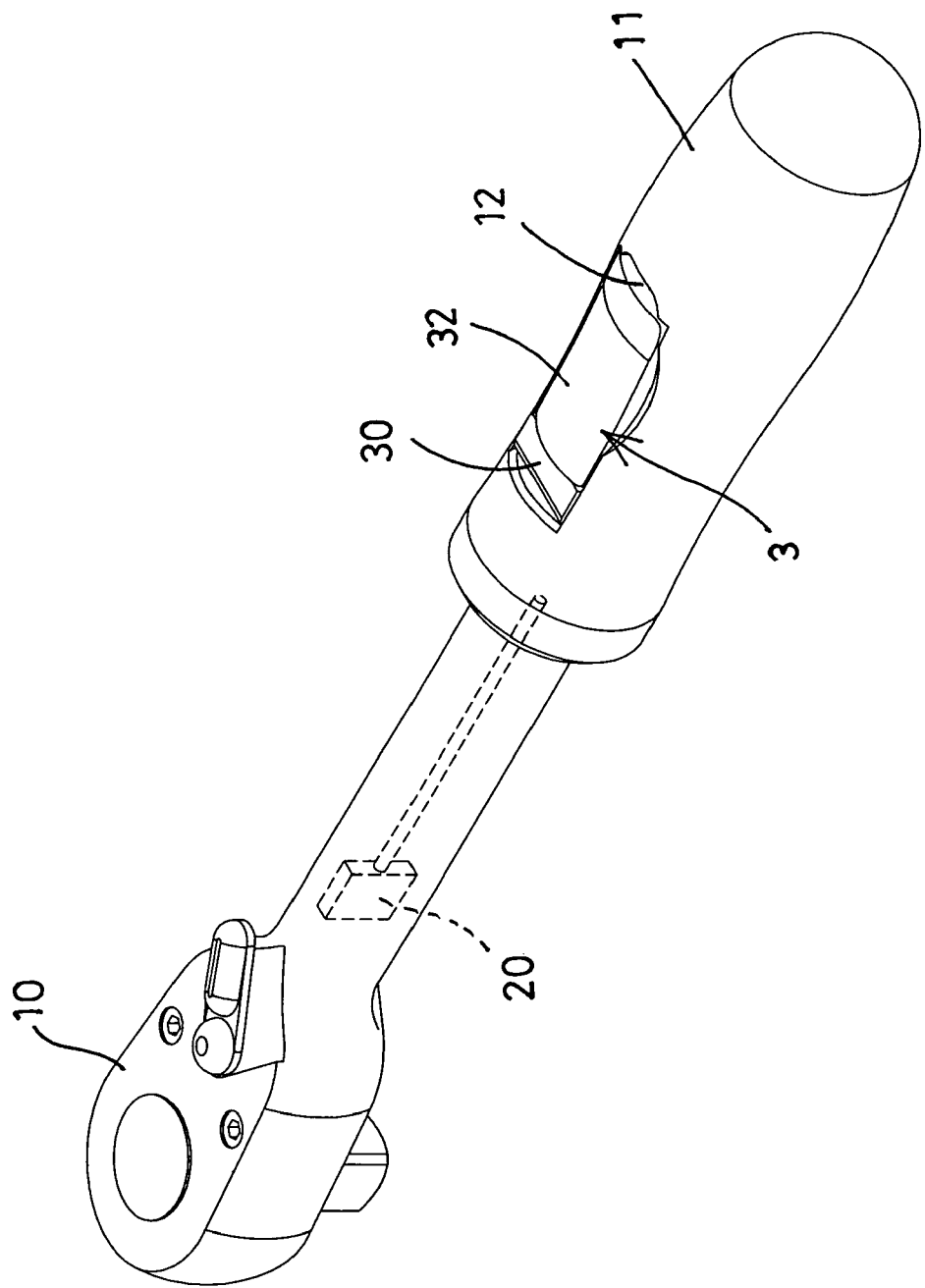
FIG. 1 is a perspective view of an electronic torque wrench in accordance with the present invention.
Figure 2:
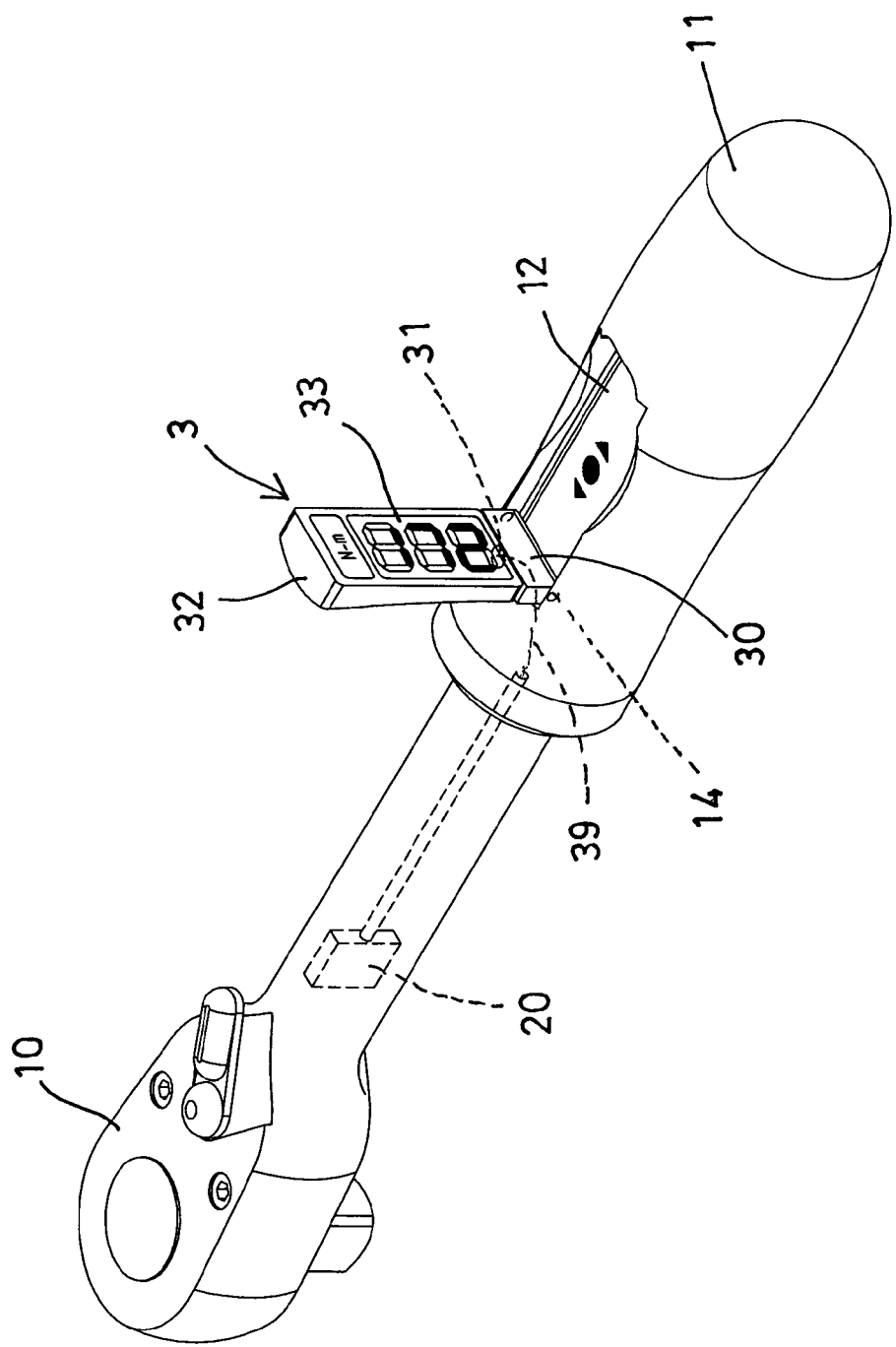
FIGS. 2, 3 are other perspective views similar to FIG. 1 illustrating the operation of the electronic torque wrench.
Figure 3:
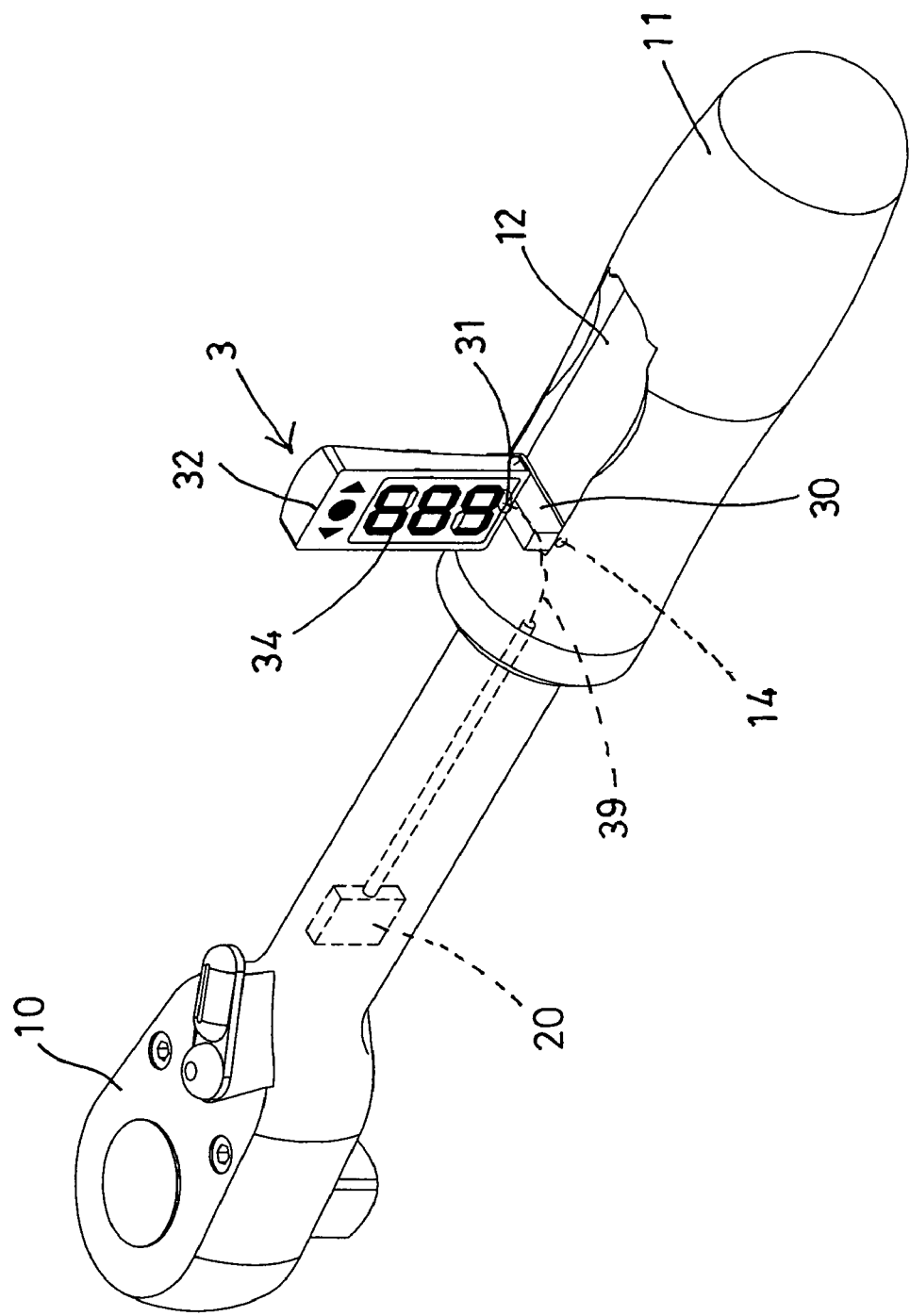

Referring to the drawings, and initially to FIGS. 1-3, an electronic torque wrench in accordance with the present invention comprises a wrench head or a wrench member 10 for engaging with a work piece (not shown) and for driving or rotating the work piece, and a wrench handle 11 attached or mounted to one end of the wrench member 10 and to be held or grasped by the user for rotating or operating the wrench member 10, and one or more strain gages 20 disposed or mounted in the wrench handle 11 and/or the wrench member 10 to detect or to measure the bending strain or the torque of the torque wrench. The above-described structure is typical and will not be described in further details.

The wrench handle 11 of the electronic torque wrench in accordance with the present invention comprises a recess 12 formed therein, such as formed in the upper portion thereof, and a socket 14 formed in the wrench handle 11 and communicative with the recess 12 of the wrench handle 11, and a digital display 3 including a base or seat 30 pivotally attached to the socket 14 of the wrench handle 11 for allowing the seat 30 and the digital display 3 to be pivoted or rotated relative to the wrench handle 11 to various or different angular position and for allowing the digital display 3 to be easily seen by the user.

The digital display 3 includes a pivot axle 31 extended outwardly from the seat 30, and a displayer 32 pivotally or rotatably attached or mounted or coupled to the pivot axle 31 of the seat 30 for allowing the displayer 32 to be pivoted or rotated relative to the wrench handle 11 and/or the seat 30 to various or different angular position and for allowing the digital display 3 further to be easily seen by the user. It is preferable that the digital display 3 includes two opposite screens 33, 34 (FIGS. 2, 3) formed or provided on the displayer 32 for allowing either of the screens 33, 34 to be easily and readily seen by the user. The digital display 3 may be electrically coupled to the strain gages 20 with an electric wire or cable 39 which may be engaged through the seat 30 and the pivot axle 31 of the seat 30 (FIGS. 2 and 3).

In operation, as shown in FIGS. 2 and 3, the digital display 3 may be pivoted or rotated relative to the wrench handle 11 to various or different angular position, and the displayer 32 may be pivoted or rotated relative to the seat 30 to various or different angular position and for allowing either of the screens 33, 34 to be easily and readily seen by the user and for allowing the bending strain or the torque or the information detected or measured by the strain gages 20 to be easily seen from either of the screens 33, 34 of the displayer 32. After use, as shown in FIG. 1, the seat 30 and the displayer 32 of the digital display 3 may be folded and engaged and stored into the recess 12 of the wrench handle 11.

Figure 4:
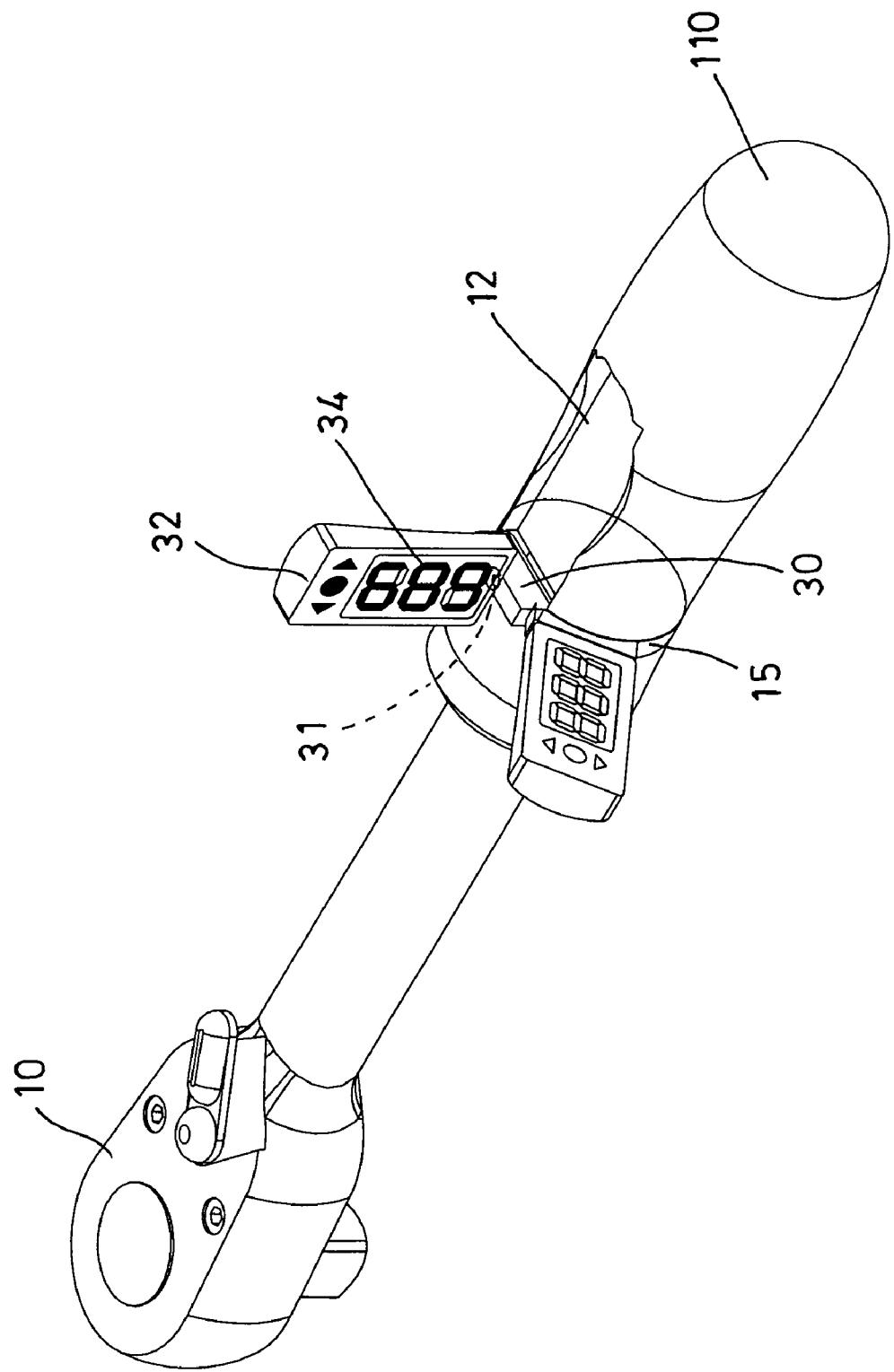
FIG. 4 is a further perspective view similar to FIGS. 1-3 illustrating the other arrangement of the electronic torque wrench.

Alternatively, as shown in FIG. 4, the wrench handle 110 may further include a peripheral channel 15 formed therein for slidably receiving or attaching or engaging with the seat 30 of the digital display 3 and for allowing the seat 30 and the displayer 32 of the digital display 3 to slide or to be moved or adjusted along the peripheral channel 15 to various or different angular position relative to the wrench handle 11 and thus for allowing either of the screens 33, 34 to be easily and readily seen by the user.

Figure 5:
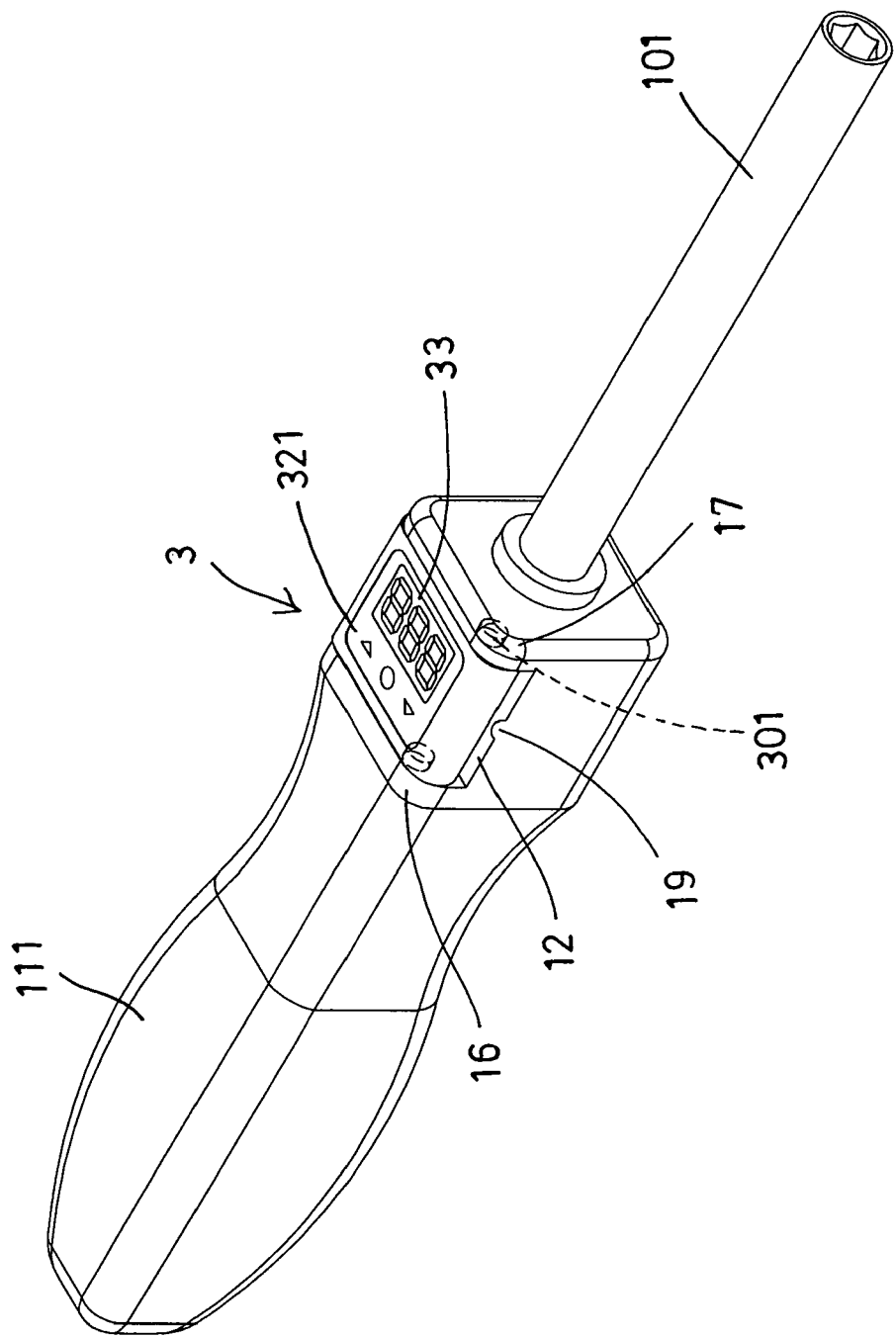
FIG. 5 is a still further perspective view illustrating the further arrangement of the electronic torque wrench.
Figure 6:
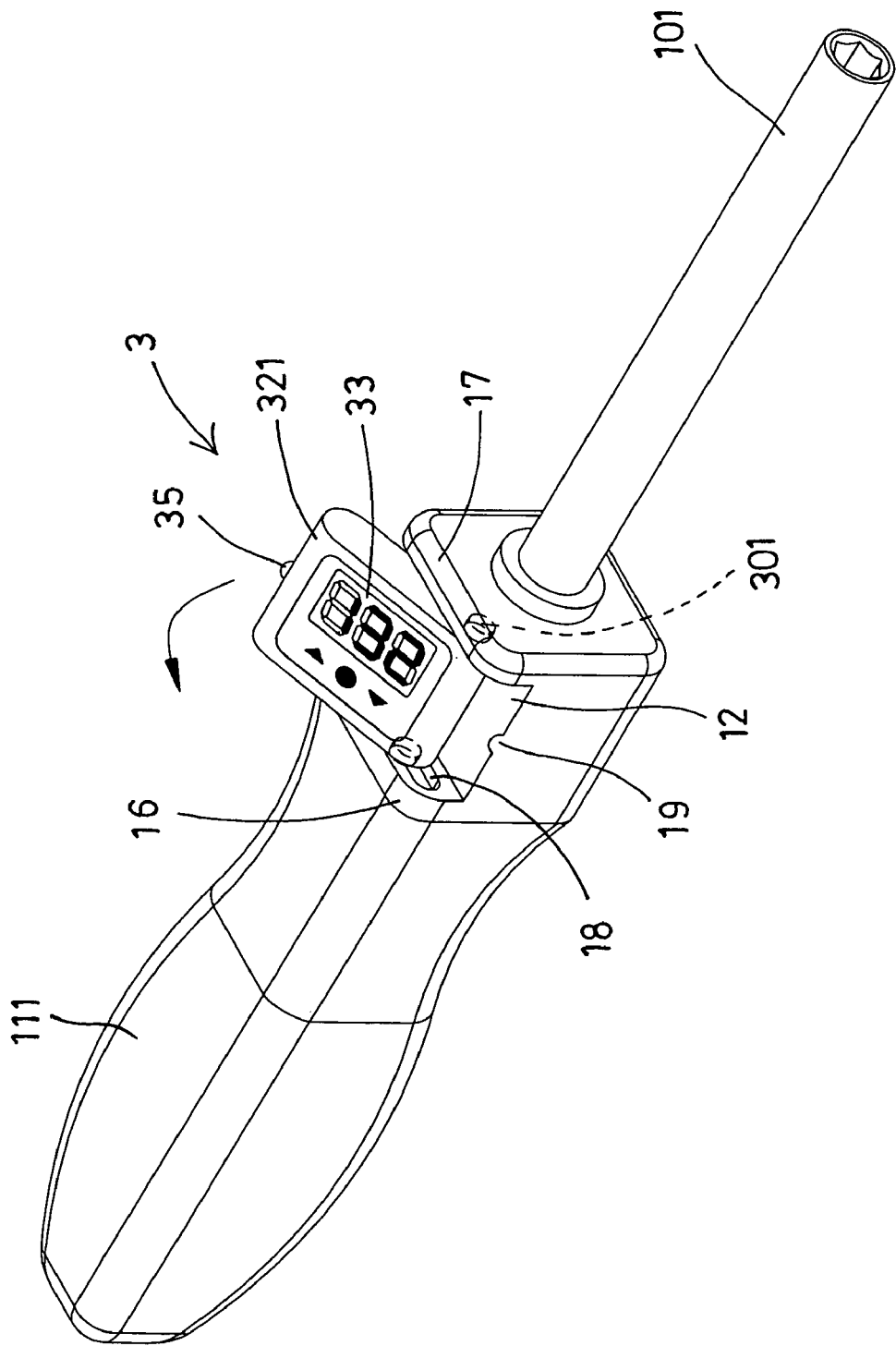
FIGS. 6, 7 are still further perspective views similar to FIG. 5 illustrating the operation of the electronic torque wrench as shown in FIG. 5.
Figure 7:
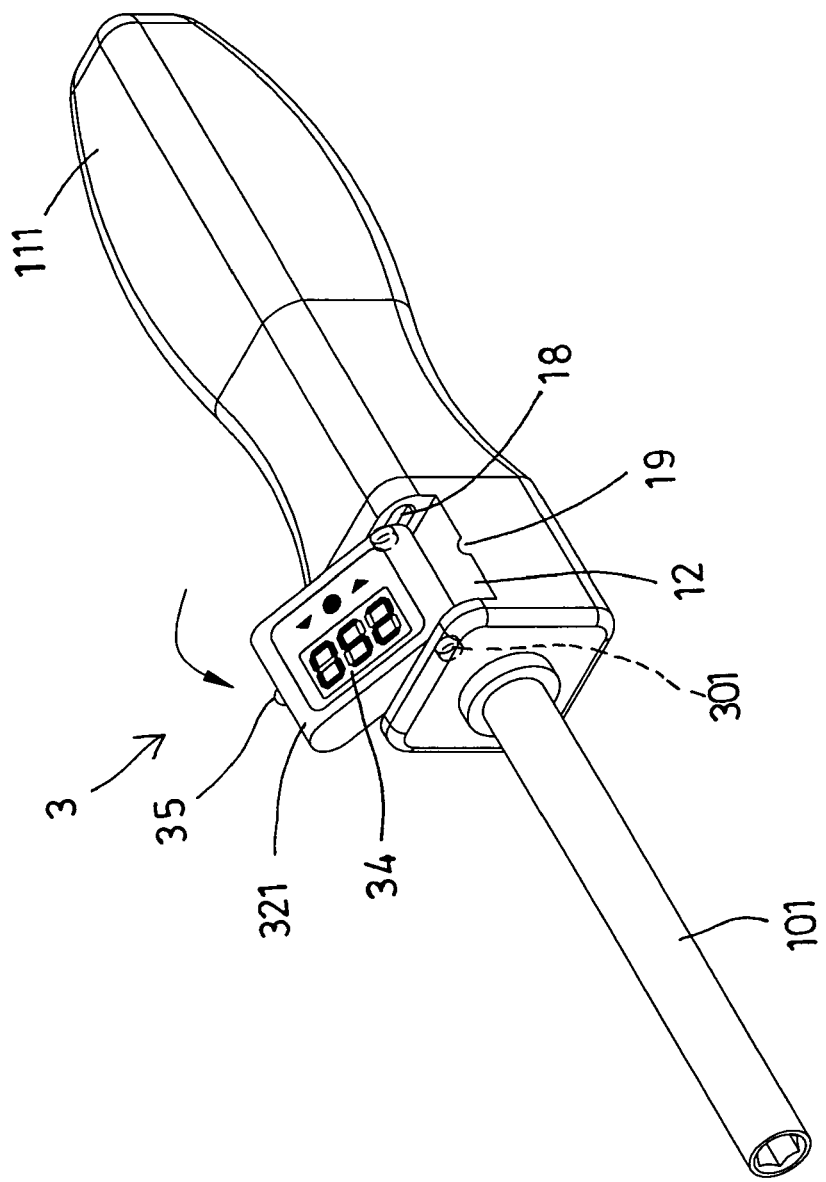

Further alternatively, as shown in FIGS. 5-7, the electronic torque wrench includes a wrench handle 111 attached or mounted to one end of the wrench member 101, and includes two opposite fences 16, 17 to form or define the recess 12 of the wrench handle 111, and includes a groove 18 formed in each of the fences 16, 17, and includes two opposite projections or stops 19 oppositely extended into the recess 12 of the wrench handle 111, and the displayer 321 of the digital display 3 may further include a pivot shaft 301 directly and slidably received or attached or engaged within the grooves 18 of the fences 16, 17 of the wrench handle 111 for allowing the displayer 321 to be pivoted or rotated relative to the wrench handle 111 and for allowing either of the screens 33, 34 to be easily and readily seen by the user, and may further include a catch 35 for engaging with either of the stops 19 and for anchoring or positioning the displayer 321 in the storing position as shown in FIG. 5.

It is to be noted that the digital display 3 may be pivoted or rotated relative to the wrench handle 11 to various or different angular position, and the displayer 32 may further be pivoted or rotated relative to the seat 30 to various or different angular position, such that either of the screens 33, 34 may be easily and readily seen by the user and such that the bending strain or the torque or the information detected or measured by the strain gages 20 may be easily seen from either of the screens 33, 34 of the displayer 32. The seat 30 and the displayer 32 of the digital display 3 may be folded and engaged and stored into the recess 12 of the wrench handle 11 (FIG. 1) when or after the displayer 32 of the digital display 3 is no longer required to be used.

Accordingly, the electronic torque wrench in accordance with the present invention includes a digital display pivotally attached to the wrench handle for allowing the digital display to be pivoted or rotated relative to the wrench handle to various angular position and for allowing the digital display to be easily and readily seen by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electronic torque wrench comprising:
   a wrench member,
   a wrench handle mounted to said wrench member and to be held by a user for operating said wrench member,
   a seat pivotally attached to said wrench handle for allowing said seat to be pivoted relative to said wrench handle, said seat including a pivot axle,
   at least one strain gage disposed in said wrench member, and
   a digital display including a displayer pivotally attached to said pivot axle of said seat for allowing said displayer of said digital display to be pivoted relative to said seat and said wrench handle to different angular position and for allowing said displayer of said digital display to be easily seen by the user, and said seat and the displayer of the digital display being foldable to engage with the wrench handle in a storing position.

2. The electronic torque wrench as claimed in claim 1, wherein said wrench handle includes a recess formed therein for receiving and storing said displayer of said digital display.

3. The electronic torque wrench as claimed in claim 2, wherein said wrench handle includes a socket formed therein and communicative with said recess of said wrench handle for pivotally attaching said displayer of said digital display.

4. The electronic torque wrench as claimed in claim 1, wherein said displayer includes two opposite screens.

* * * * *